US008061005B2

(12) United States Patent  (10) Patent No.: US 8,061,005 B2
Kipp et al.  (45) Date of Patent: Nov. 22, 2011

(54) METHOD FOR EMPLOYING QUICK CHANGE INJECTION MOLDING TOOLING

(75) Inventors: Randall D. Kipp, Upland, CA (US);
George M. Mansour, Pomona, CA (US); Patrick Elliott, Lake Elsinore, CA (US); Steven G. Young, Mission Viejo, CA (US)

(73) Assignee: CareFusion 303, Inc., San Diego, CA (US)

( * ) Notice: Subject to any disclaimer, the term of this patent is extended or adjusted under 35 U.S.C. 154(b) by 77 days.

(21) Appl. No.: 12/611,675

(22) Filed: Nov. 3, 2009

(65) Prior Publication Data
US 2010/0229365 A1  Sep. 16, 2010

Related U.S. Application Data

(60) Provisional application No. 61/160,064, filed on Mar. 13, 2009.

(51) Int. Cl.
*B23P 11/00* (2006.01)
*B23Q 7/00* (2006.01)
*B29C 33/00* (2006.01)
(52) U.S. Cl. .......... 29/426.1; 29/527.1; 29/559
(58) Field of Classification Search .......... 29/426.1, 29/559; 425/185, 190, 192 R, 193, 595; 249/102
See application file for complete search history.

(56) References Cited

U.S. PATENT DOCUMENTS

| | | | |
|---|---|---|---|
| 1,748,250 A | 2/1930 | Spang | |
| 3,669,599 A | 6/1972 | Snider et al. | |
| 3,806,297 A | 4/1974 | Scales | |
| 4,473,346 A * | 9/1984 | Hehl | 425/183 |
| 4,505,664 A | 3/1985 | Craig | |
| 4,944,629 A | 7/1990 | Peveto | |
| 5,096,404 A * | 3/1992 | Janos et al. | 425/190 |
| 5,114,330 A | 5/1992 | Nielsen | |
| 5,246,362 A * | 9/1993 | Kobayashi et al. | 425/135 |
| 5,262,116 A * | 11/1993 | Von Holdt, Sr. | 264/297.2 |
| 5,619,913 A * | 4/1997 | Padovani | 100/35 |
| 5,620,723 A * | 4/1997 | Glaesener et al. | 425/589 |
| 5,643,615 A * | 7/1997 | Austin | 425/186 |
| 6,036,469 A * | 3/2000 | Allen et al. | 425/192 R |
| 6,572,356 B2 | 6/2003 | Seger | |
| 7,223,088 B2 * | 5/2007 | DiSimone | 425/190 |
| 7,497,677 B1 * | 3/2009 | Crian et al. | 425/185 |
| 7,500,843 B2 * | 3/2009 | Crain et al. | 425/185 |
| 7,793,705 B2 * | 9/2010 | Kuo | 164/340 |
| 2009/0181118 A1 * | 7/2009 | Masanek, Jr. | 425/185 |
| 2009/0324767 A1 * | 12/2009 | Kloeppel et al. | 425/190 |

OTHER PUBLICATIONS

International Search Report and the Written Opinion issued for PCT/US2010/024284, dated Apr. 16, 2010, 8 pages.
Declaration of Randall D. Kipp dated Oct. 28, 2009, 3 pages.

\* cited by examiner

*Primary Examiner* — Jermie Cozart
(74) *Attorney, Agent, or Firm* — McDermott Will & Emery LLP

(57) ABSTRACT

A method comprises loading a tooling module onto a module carrier unit, inserting the module carrier unit into a molding press so that the carrier unit rests on a supporting member of an injection molding press, and closing the molding press until the tooling module is mated to an ejection side of a mold base.

16 Claims, 10 Drawing Sheets

METHOD FOR EMPLOYING QUICK CHANGE INJECTION MOLDING TOOLING

CROSS-REFERENCE TO RELATED APPLICATION

This application claims the benefit of U.S. Provisional Patent Application No. 61/160,064, entitled "Quick Change Injection Molding Tooling for the Production of Threaded Parts" and filed on Mar. 13, 2009, the full disclosure of which is incorporated herein by reference.

TECHNICAL FIELD

The following description relates generally to installation and removal of tooling modules for use in a press.

BACKGROUND OF THE INVENTION

In most prior art injection molding systems, the entire base mold (also referred to as a "base mold") must be removed from the mold press to replace cavities and other components housed therein. Removing base molds is labor intensive and can shut down a mold press for extended amounts of time. Another problem with these systems is that modules and cavities are bolted together. Replacing or servicing modules and cavities is, therefore, both time consuming and tedious.

There are several types of quick change tooling on the market that attempt to address the aforementioned problems. They generally employ a housing/insert philosophy which minimizes the tooling footprint. While this methodology functions for molding components with "open and shut" geometry it does not allow for more sophisticated geometries such as threads. These approaches also do not facilitate rapid and accurate change over as the inserts do not have a carrier which is used to position the insert for installation and removal. Removal of modules is, therefore, difficult and time consuming.

BRIEF SUMMARY OF THE INVENTION

Various embodiments of the present invention are directed to systems and methods for rapidly and accurately installing mold tooling into an injection molding press. One example embodiment of the system is comprised primarily of a carrier, tooling module, mold base, and carrier cart. The tooling module is constructed from standard tool plates and contains standard automatic injection tooling features (e.g., cooling lines, guided ejection, etc.) and is machined to allow the insertion of different cavity stacks to form plastic components of varying geometry. The plastic components can include features that previously would have been prohibitively expensive to incorporate in quick change tooling, notably threads (both internal and external). Once the cavity stacks have been assembled into the module, the module is moved to the carrier cart where the module is mated to the carrier.

Continuing with the example, the modules are loaded into the carrier which is placed on a purpose built carrier cart that allows tooling modules to be assembled and secured before they are moved to the press. The carrier unit is employed for the purpose of installation and removal of the tooling module from the mold base, which remains in an injection molding press. The mold base is mounted semi-permanently in the press and accepts the modules from the carrier unit. The carrier unit uses the tie bars of the press to position itself with reference to the mold base. Positioning on the tie bars facilitates the rapid removal of installed modules and rapid installation of new modules.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1A:
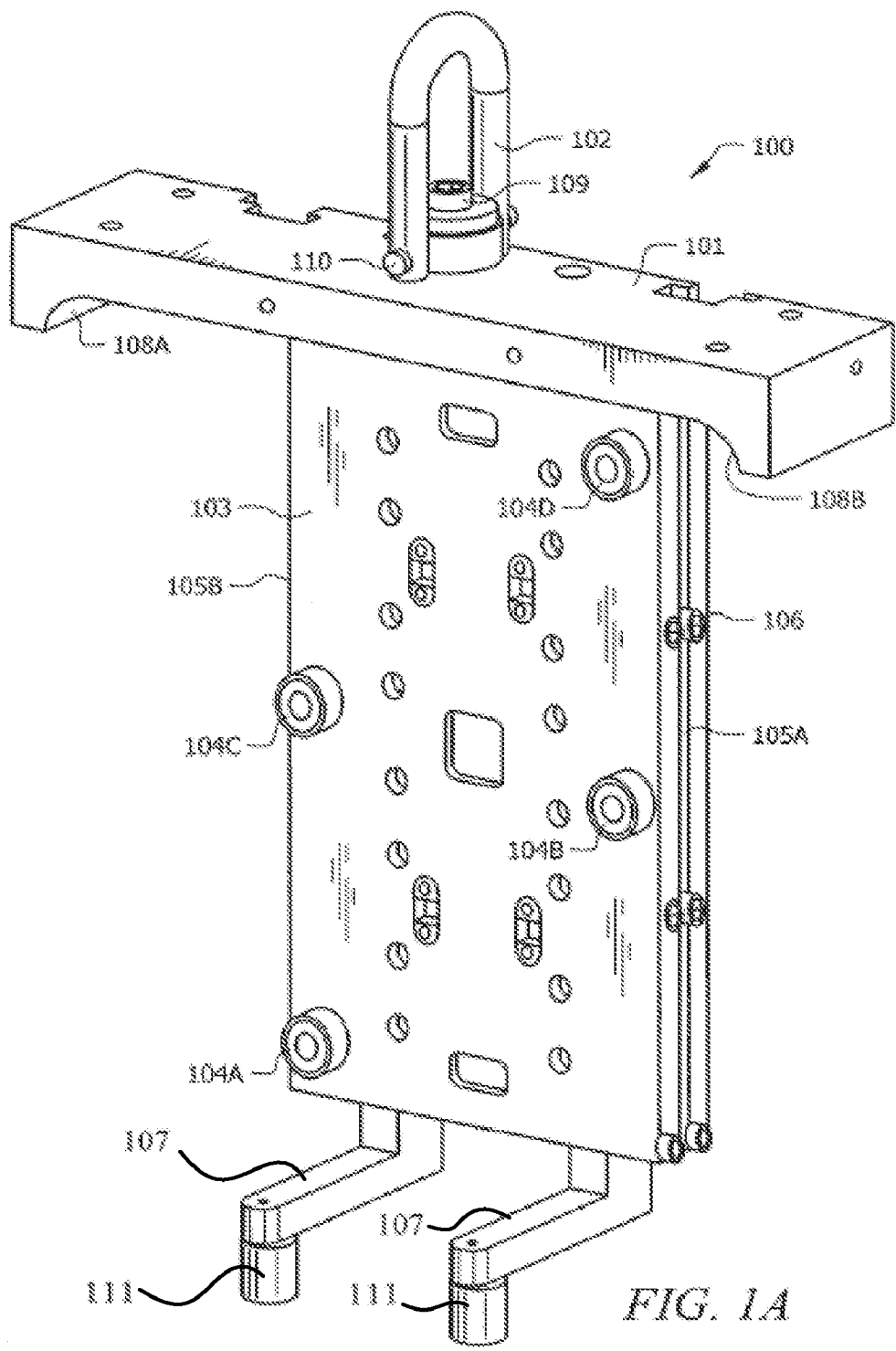
FIG. 1A is an illustration of an exemplary module carrier according to one embodiment of the invention.

FIG. 1A illustrates an exemplary module carrier 100 according to one embodiment of the present invention. As illustrated by FIG. 1A, module carrier 100 comprises tie bar mount 101, eye bolt 102, mount plate 103, air locks 104A-104D, receiving channels 105A and 105B, roller bearings 106, and carrier bumpers 107.

To facilitate quick and accurate removal and installation of tooling modules (e.g., module 200 which will be discussed with respect to FIG. 2) into the mold base of an injection molding press, the carrier unit is designed to rest on the tie bars of an injection molding press. Tie bar mount 101 is designed to rest across horizontally extended tie bars coupling the platen of an injection mold press. Tie bar mount 101 is tooled such that when the tie bar mount 101 lies across two horizontally extended tie bars, radius 108A cups one tie bar and radius 108B cups a second tie bar.

Eye bolt 102 is coupled to tie bar mount 101 and allows module carrier 100 to be lifted by an overhead crane. As shown in FIG. 1A, eye bolt 102 may rotate around axis 109 and rotate around axis 110 to facilitate loading and unloading of modules onto the carrier cart and into the mold base, as will discussed in greater detail below. Although an eye bolt is shown by FIG. 1A, persons of ordinary skill will recognize that other mechanisms for lifting or hoisting (e.g., a ring or shackle) the module carrier can be coupled to the tie bar mount.

Mount plate 103 is coupled to tie bar mount 101 and is designed to facilitate housing of tooling modules. A module is mounted to the face of module carrier 100 and held into place by air locks 104A-104D. In the embodiment shown in FIG. 1A, air locks 104A-104D are Segan locks. Although Segan locks are shown, any type of hydraulic lock known in the art that is configured in a normally closed position (i.e., the locks open when air pressure is supplied by way of an air line and compressor, and the locks are closed when no air is supplied) may be employed in various embodiments of the present invention. Mounting of tooling modules to the module carrier is discussed in more detail below.

Mount plate 103 is also designed to guide module carrier 100 onto receiving rails on a carrier cart (e.g., carrier cart 300 shown in FIG. 3A) and, in some instances, receiving rails on a molding press. Mount plate 103 includes receiving channels 105A and 105B on either side of mount plate 103. Receiving channels 105A and 105B are designed to mate with receiving rails (e.g., receiving rails 304 and 305 shown in FIG. 3A) and guide module carrier 100 into position. Mount plate 103 also includes a plurality of roller bearings 106 to facilitate mating of the receiving channels 105A and 105B with receiving rails. In the embodiment illustrated by FIG. 3A, there are four sets of roller bearings 106 for each of receiving channels 105A and 105B.

When carrier 100 is used to insert modules into a base mold, carrier 100 is lifted by the eye bolt 102. Carrier 100 is then lowered into a mold press and tie bar mount 101 extends across the press and rests over the horizontal tie bars connecting the platen of the press. The configuration of tie bar mount 101, which is designed to fit over the tie bars between the platen on the mold press, ensures that the tooling modules carried by module carrier 100 are in the correct location so that the mold can be closed. When the mold is closed with module carrier 100 in place, the modules on carrier 100 are inserted into the ejection side of the mold. Once inserted, and as discussed in greater detail below, the molds are locked in place.

Module carrier 100 shown in FIG. 1A also includes carrier bumpers 107. Bumpers 107 are coupled to mount plate 103 and are designed to ensure that module carrier 100 cannot be lowered into a press unless the mold base has been opened wide enough to accept module carrier 100. That is, if there is not enough clearance for the mold base to accept carrier 100, safety bumpers 107 will come to rest on the top of the mold base allowing a crane operator to halt lowering of carrier 100 before the full weight of module carrier 100 comes down onto the mold base. The carrier bumpers 107 shown in FIG. 1A include urethane feet 111.

Figure 1B:
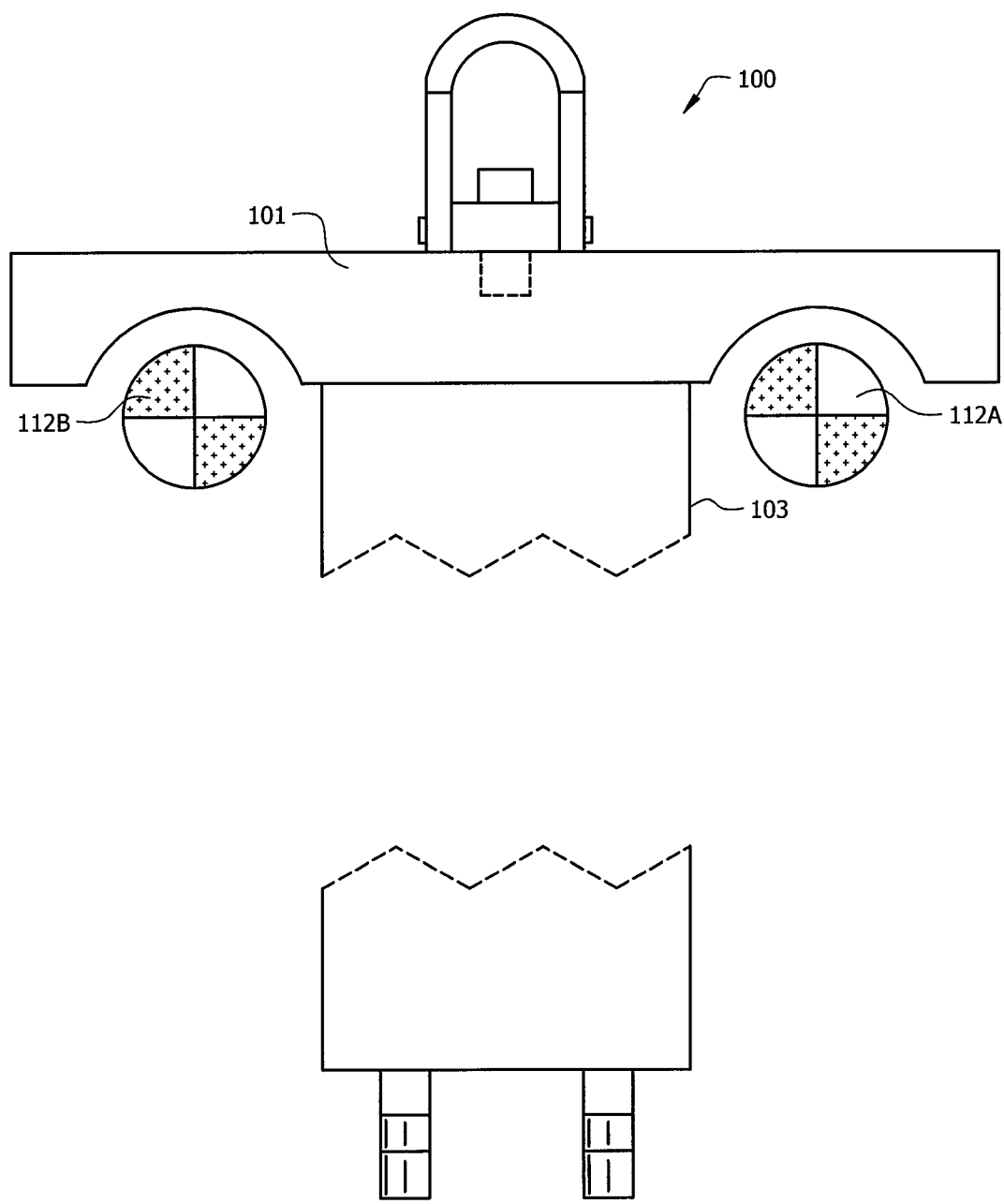
FIG. 1B is an illustration of an exemplary module carrier according to one embodiment of the present invention.

FIG. 1B illustrates another embodiment of module carrier 100. This illustration shows how the tie bar mount 101 can be designed to cup tie bars 112A and 112B.

Figure 2:
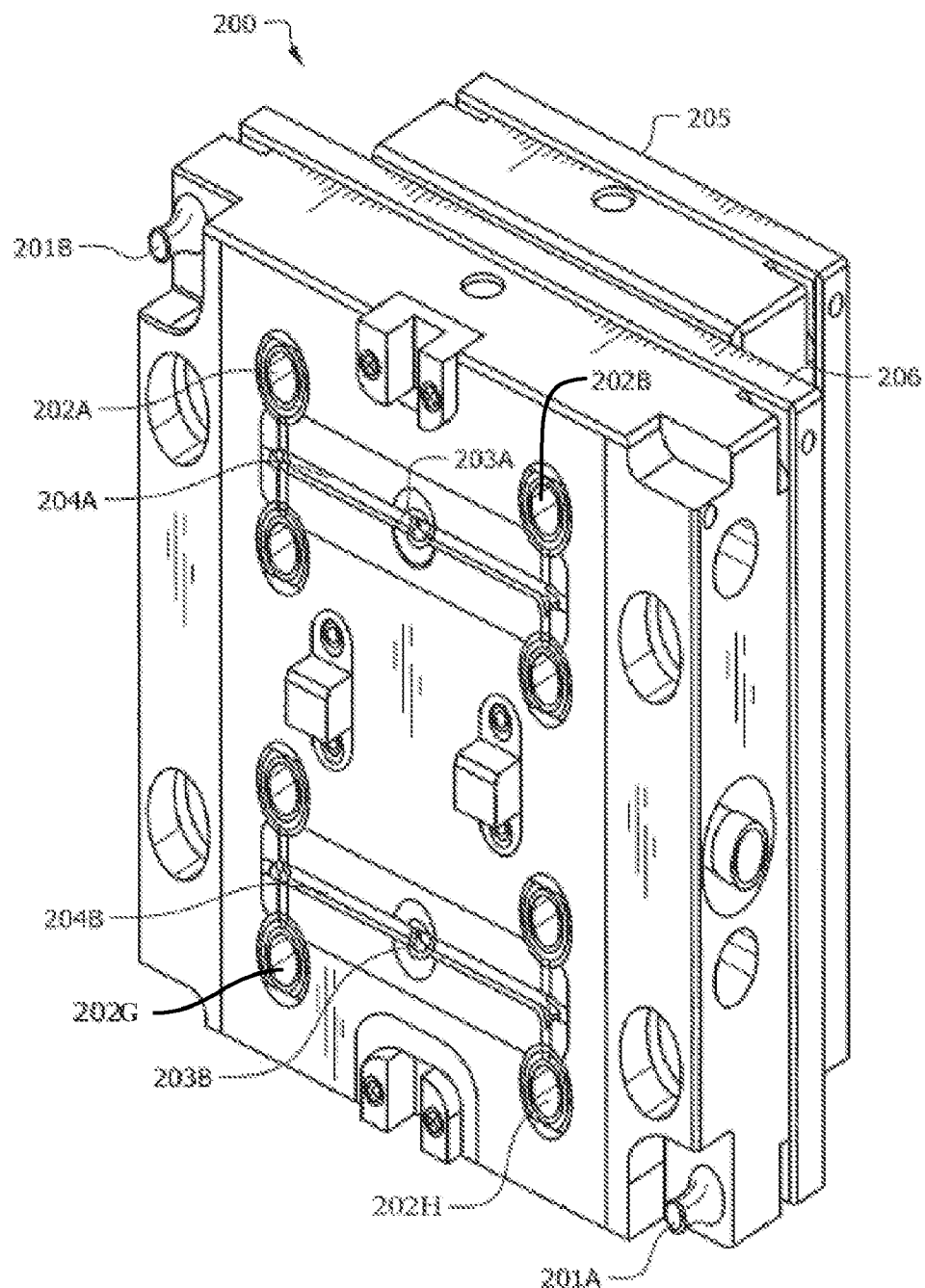
FIG. 2 is an illustration of an exemplary tooling module according to one embodiment of the invention.

FIG. 2 illustrates an example tooling module 200 according to one embodiment of the present invention. Tooling module 200 is designed to precisely fit into the ejection side of a mold base (the placement of a module into a mold base will be discussed in greater detail below with respect to FIG. 5A). Tooling module 200 is constructed from standard tool plates and contains standard automatic injection tooling features (e.g., cooling lines, guided ejections, etc.) and is designed to mate with the carrier unit to enable quick change out of tooling modules and, therefore, quick change of cavity stacks. In some embodiments the modules have guided ejector pins and roller bearings for accuracy in loading module 200.

Tooling module 200 includes male portions of an air lock (e.g., a Segan lock) 201A and 201B. Tooling module 200 is designed such that male air lock portions 201A and 201B align and mate with corresponding female air lock portions of a module carrier (e.g., elements 104A and 104B of module carrier 100 shown in FIG. 1A). Tooling module 200 is machined to allow the insertion of different cavity stacks to form plastic components of varying geometry. In the example of FIG. 2, a hot runner system is illustrated. Plastic is injected from the injection/hot side of the mold base (e.g., 600 shown in FIG. 6). Material comes into the face of the mold at 203A and 203B and is distributed through a runner system. Material runs through runner channels (204A and 204B) and gathers in cavities 202A-202H where it cools into the desired shape. In some embodiments of tooling modules, the tooling module is designed to include male air lock portions on the tooling module face that is positioned against the injection side of a mold base (e.g., face 205). Male air lock portions could also be positioned at face 206.

Figure 3A:
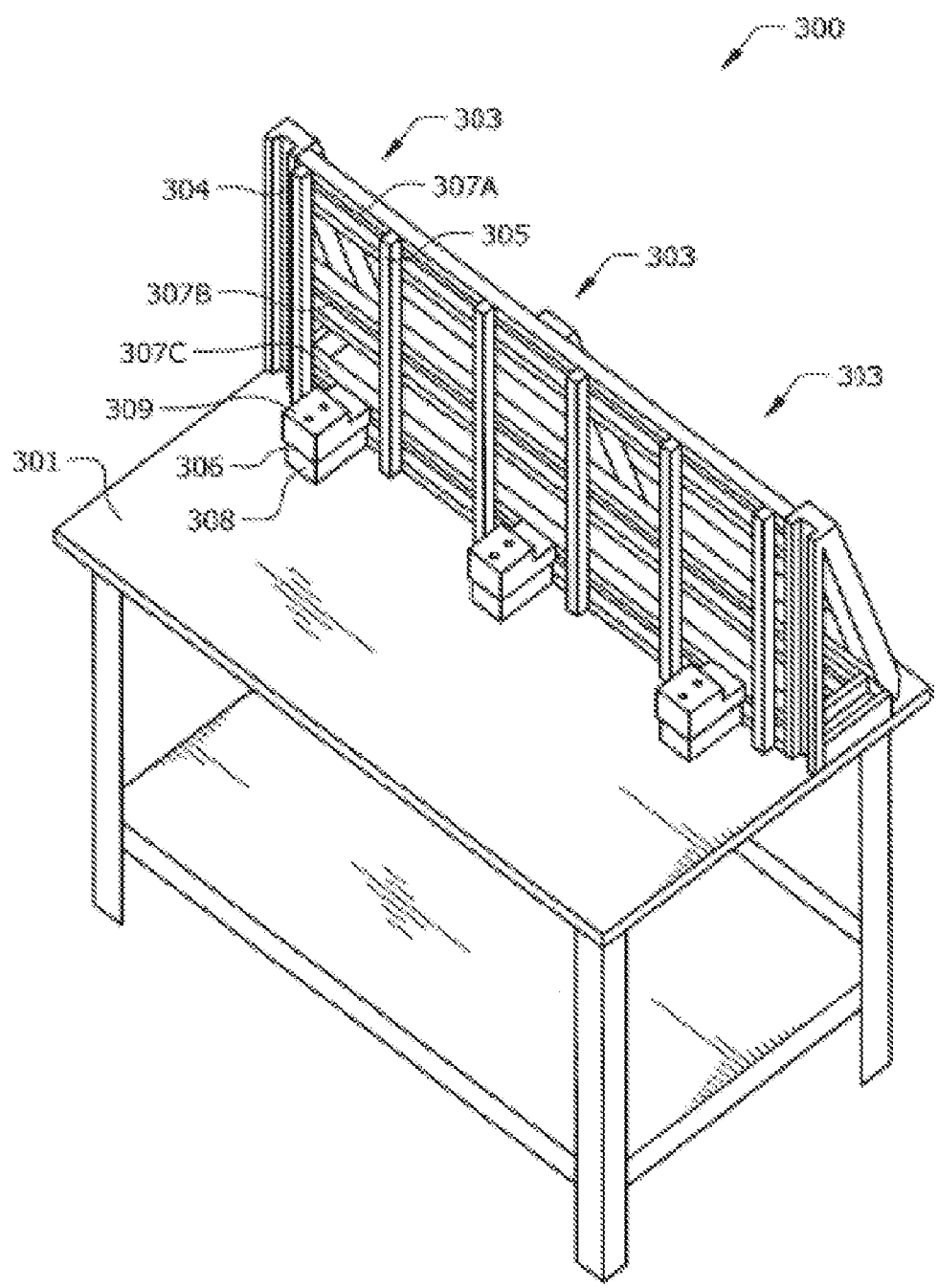
FIG. 3A is an illustration of an exemplary carrier cart according to one embodiment of the invention.

FIG. 3A illustrates an exemplary carrier cart 300 according to one embodiment of the present invention. Carrier cart 300 is used to store tooling modules and prepare tooling modules for insertion into a molding press. As shown in FIG. 3A, carrier cart 300 comprises a table 301 and support structure 302. Support structure 302 is fastened to table 301 and facilitates the storage of tooling modules (e.g., tooling module 200 shown in FIG. 2) and loading and unloading of tooling modules onto carrier units (e.g., carrier unit 100 as shown in FIG. 1A).

Figure 3B:
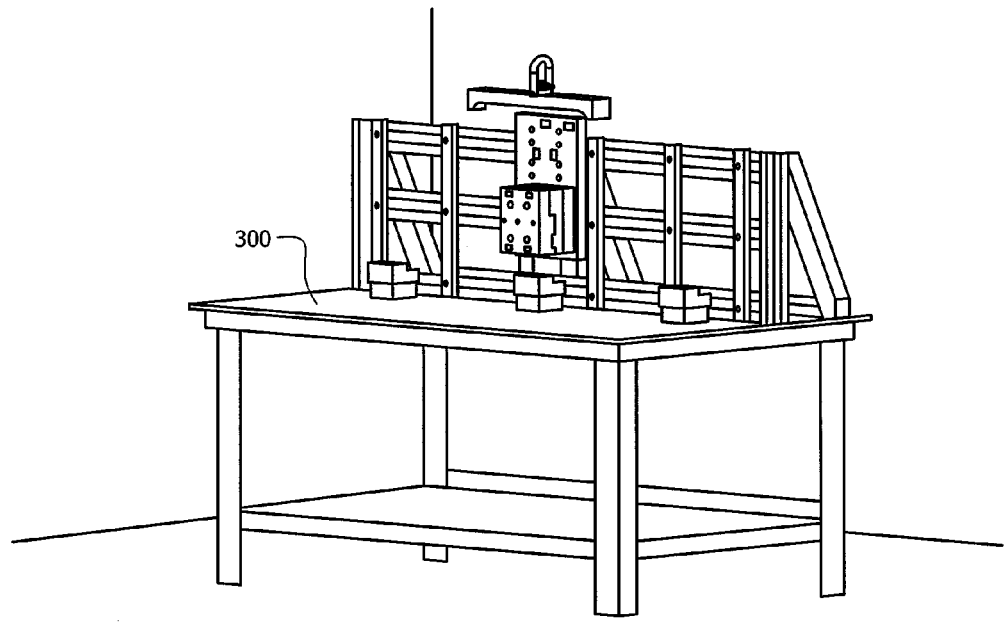
FIG. 3B is an illustration of an exemplary carrier cart housing a module carrier with one tooling module according to one embodiment of the invention.
Figure 3C:
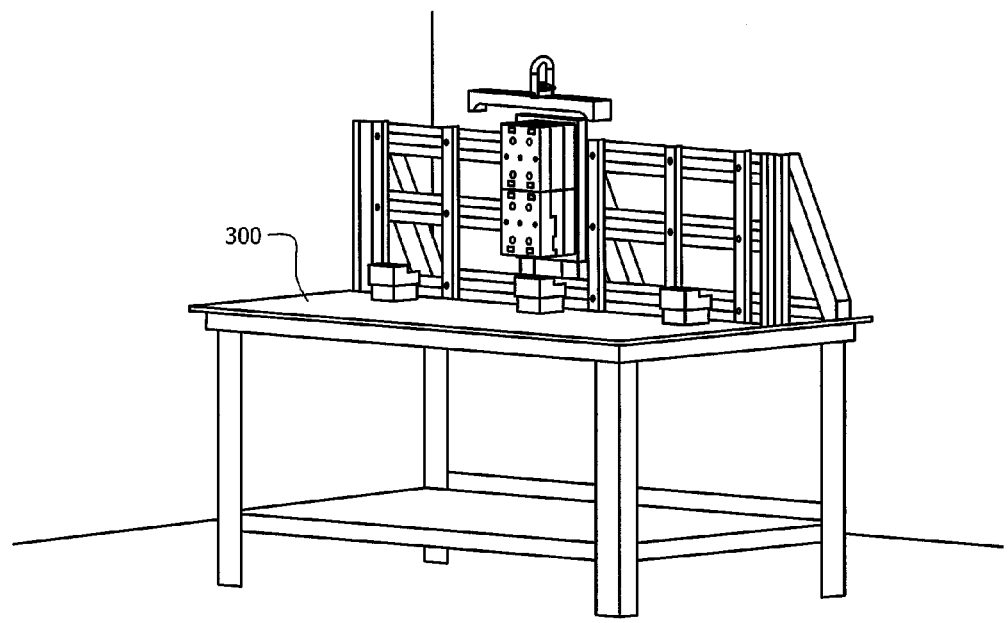
FIG. 3C is an illustration of an exemplary carrier cart housing a module carrier with two tooling modules according to one embodiment of the invention.

Support structure 302 comprises a plurality of carrier receiving units 303, which includes receiving rails 304 and 305, carrier rest stand 306, and supports 307A-307C. Receiving unit 303 is designed to receive a carrier unit (e.g., carrier unit 100 shown in FIG. 1A). Receiving rails 304 and 305 are fastened to supports 307A-307C and positioned to line up with and receive the receiving channels of a carrier unit (e.g., receiving channels 105A and 105B shown in FIG. 1A). Carrier rest stand 306 is fastened to table 301 and is designed so that a tooling module (e.g., tooling module 200 shown in FIG. 2) will rest on carrier rest stand 306. In the embodiment shown by FIG. 3A, carrier rest stand 306 comprises an aluminum base 308 fastened to table 301 with a polyurethane pad 309 on which a tool module rests. In the embodiment shown by FIG. 3A, polyurethane pad 309 is recessed at the end facing support structure 307 so that the bottom lip of a carrier module, which may extend below the bottom tooling module it carries, does not prevent the tooling module from resting on the carrier rest stand 306. FIG. 3B shows a carrier unit (e.g., module carrier 100 shown in FIG. 1A) mated with a carrier cart (e.g., carrier cart 300). In FIG. 3B, the carrier unit houses one tooling module (e.g., tooling module 200 shown in FIG. 2). FIG. 3C shows a carrier unit housing two tooling modules mated with a carrier cart. In some embodiments, the receiving rails on the carrier cart are identical to receiving rails on an injection molding press.

The carrier cart may also include one or more storage shelves or bins for storing tools needed to change out, clean, or repair tooling modules or other injection molding tooling. Although not shown in FIG. 3A, 3B or 3C, the tool cart might also include wheels or slides so that the cart may be easily moved within the injection molding facility. In some circumstances, it may be beneficial to prepare tooling modules in an area separate from the injection molding press (e.g., when injection molding is used to make medical devices, cleaning and preparation of tooling modules and cavities should occur outside of the clean room that houses the injection molding press).

Figure 4:
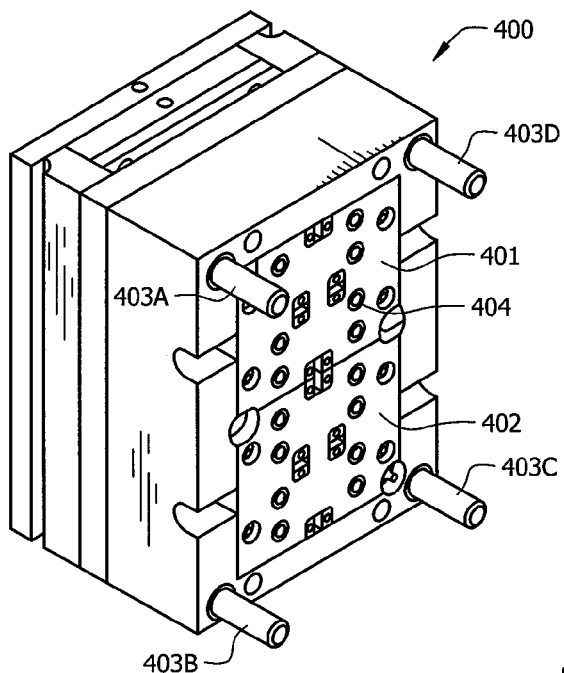
FIG. 4 is an illustration of the ejection side of an exemplary base module housing tooling modules according to one embodiment of the invention.

FIG. 4 illustrates the ejection/cold side 400 of an exemplary mold base according to one embodiment of the present invention. Ejection side 400 contains standard automatic injection tooling features (e.g., cooling lines, guided ejections, etc.) and is designed to mate with tooling modules (e.g., tooling module 200) to enable quick change out of tooling modules and, therefore, quick change of cavity stacks. Ejection side mold 400 is designed to house two tooling modules. In FIG. 4, tooling modules 401 and 402 are housed in ejection side mold 400. Such tooling modules 401 and 402 are identical to tooling module 200 shown in FIG. 2. Ejection side mold 400 is designed to mate with the injection/hot side of a mold base, which will be discussed in more detail below. Ejection side 400 also includes guide pins 403A-403D. Guide pins 403A-403D guide the two mold halves (ejection side 400 and injection side 500) into alignment when the press is closed. Although not shown, the cavity portion of ejection side mold 400, which accepts modules (401 and 402) may have female air lock portions within the cavity for accepting and locking modules into place. Modules 401 and 402 would, in such a scenario, include male air lock portions on their face meeting the face of ejection mold 400.

Figure 5:
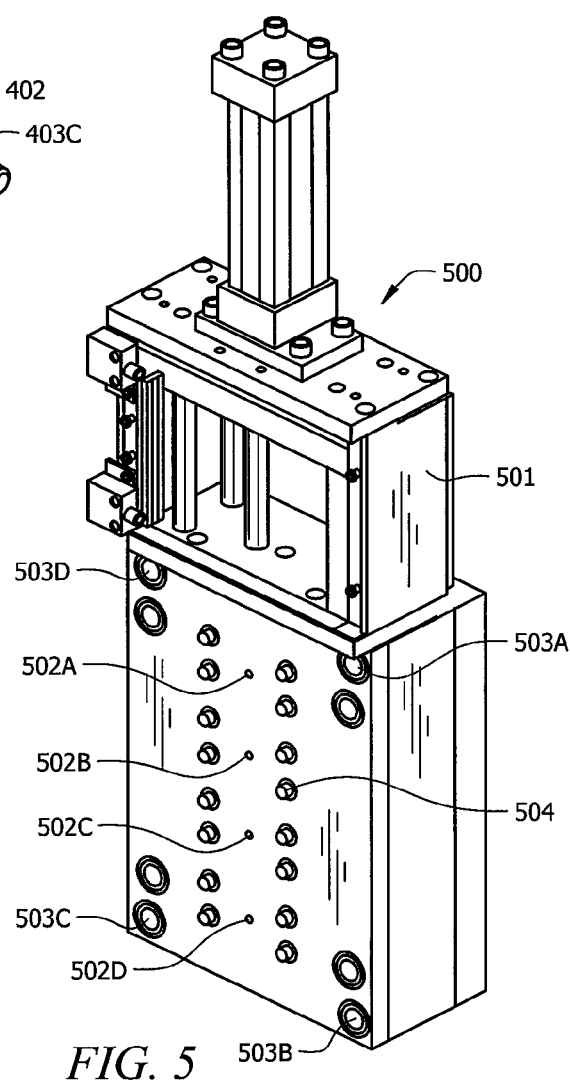
FIG. 5 is an illustration of the injection side of an exemplary base module according to one embodiment of the invention.

FIG. 5 illustrates the injection/hot side 500 of a mold base according to one embodiment of the present invention. As discussed above, injection side 500 is designed to couple with ejection side 400. Guide in bushings 503A-503D are designed to mate with guide pins 403A-403D when the press is closed to ensure that the two mold halves (400 and 500) are properly aligned. Injection side 500 is the hot half of the mold. This means that the mold material is coming in from this side. When the mold is closed (i.e., the ejection and injection halves are mated) and in operation, molten plastic is extruded through injection nipples 502A-502D into the ejector side 400 of the mold. Material comes into the face of the mold and is distributed through a runner system to a cavity (e.g., cavity 202 shown in FIG. 2).

Figure 6:
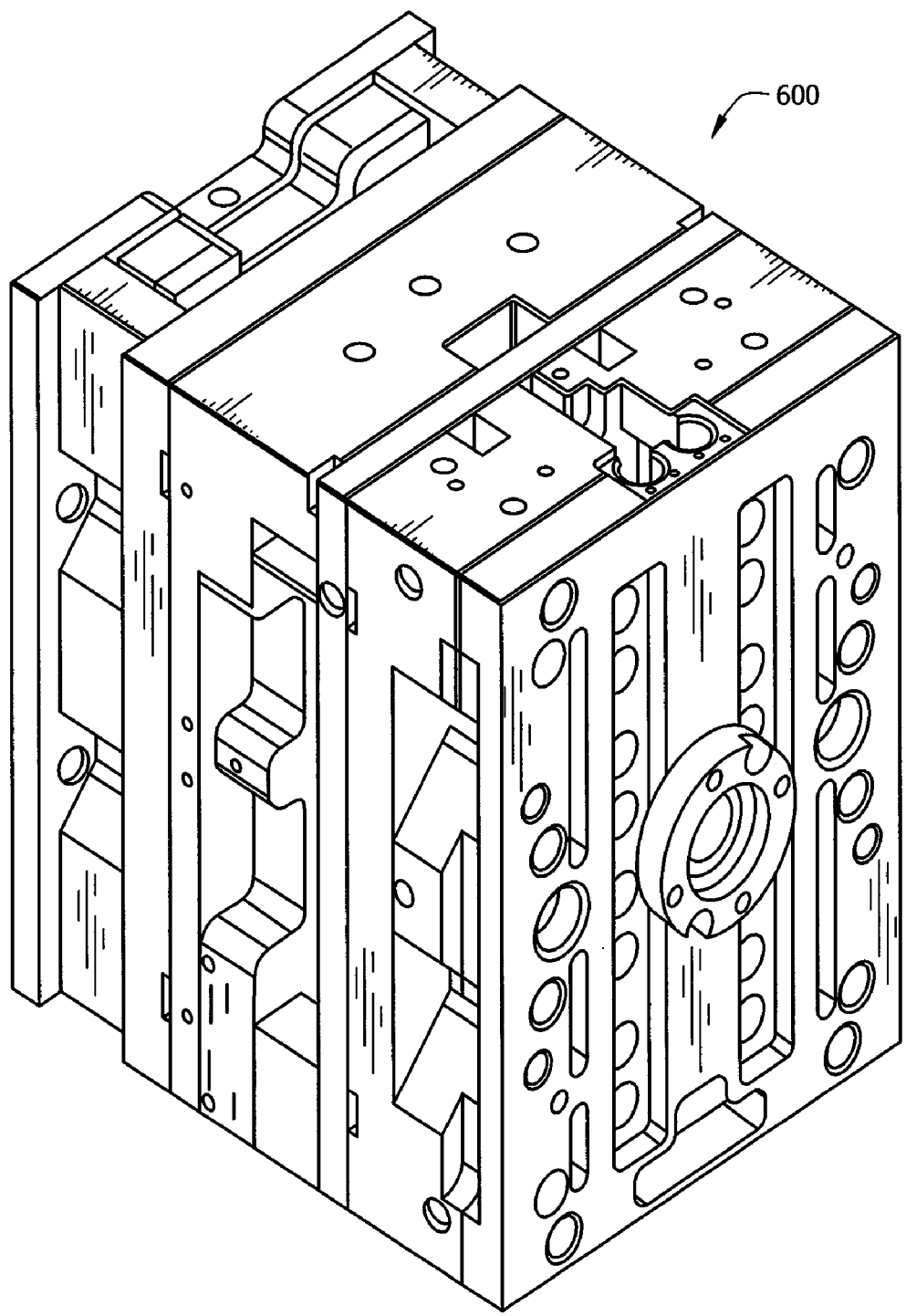
FIG. 6 is an illustration of an exemplary base module according to one embodiment of the invention.

Injection side 500 also includes an unwinder rack assembly 501, which is used to create a thread on the inside of a part. When the mold is closed, core 504 is in an outward position, so the plastic forms around core 504. Thus, in the example of ejection side 400 mated with injection side 500, core 504 extends into cavity 404 (or cavity 202 as labeled in FIG. 2) and the injected material collects in the cavity and surrounds core 504. When the mold has cooled, the hydraulic unit drives a rack assembly that drives a gear and, in turn, unwinds the thread (it is on the same pitch as the thread). Core 504 unwinds itself from the molded part so the part can come out freely. That is, when the rack is driven down, the unwinder rack assembly drives the unwinder core back outside of the molded piece in cavity 404, and core 504 itself is outside of the molded part, which can then freely fall. FIG. 6 illustrates the closed mold base 600, which shows the coupling of ejection side 400 and injection side 500. FIG. 6 does not show the unwinding mechanism (e.g., 501).

Figure 7:
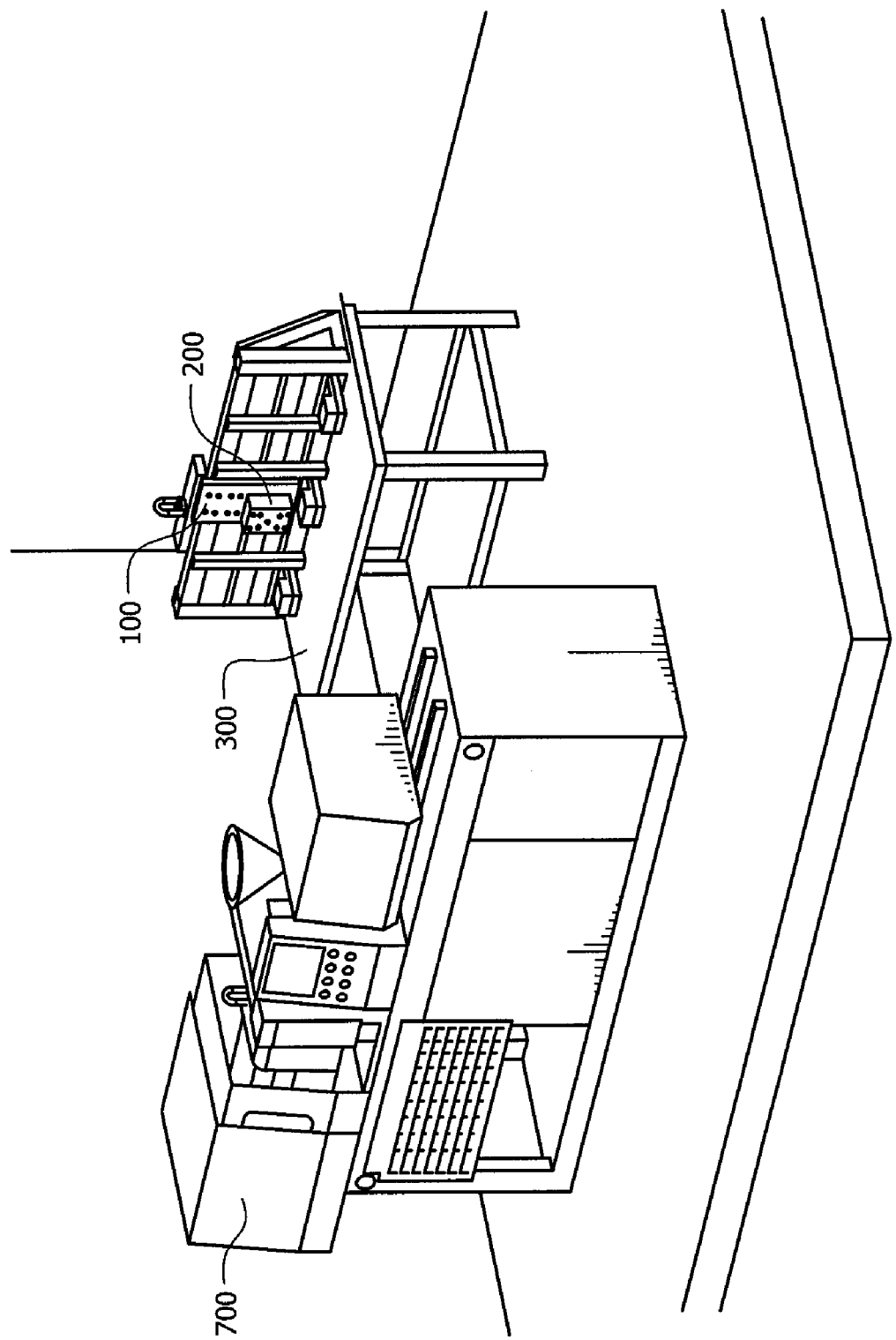
FIG. 7 is an illustration of an exemplary molding floor overview showing an exemplary injection molding press, exemplary module carriers, an exemplary carrier cart, and exemplary tooling modules according to embodiments of the invention.
Figure 8:
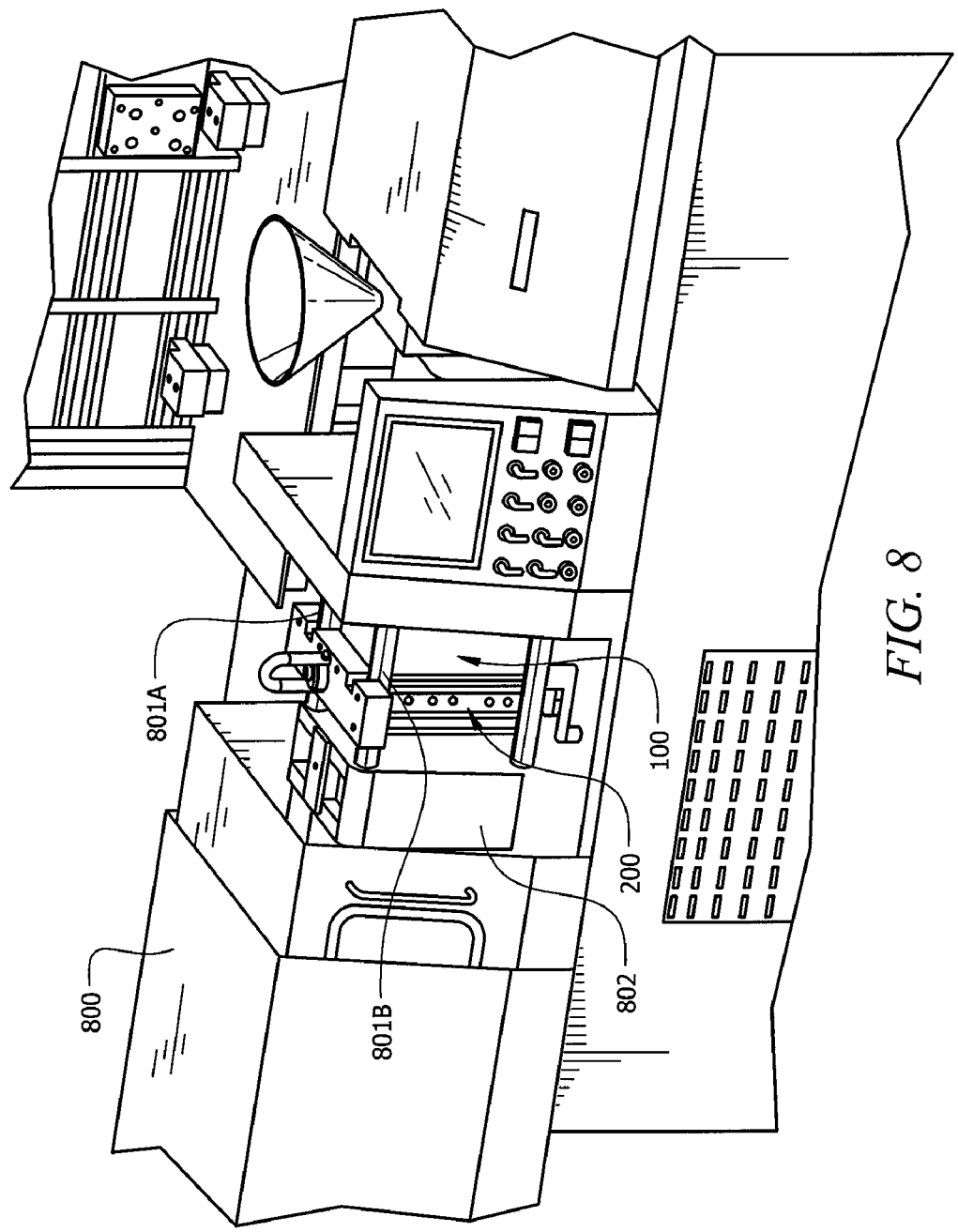
FIG. 8 is an illustration of an exemplary injection molding press with an exemplary carrier unit lowered into the injection molding press according to one embodiment of the invention.

FIG. 7 illustrates a molding floor overview. The exemplary molding floor includes an injection molding press 700 and carrier cart 300. Carrier cart 300 is mated with module carrier 100, which is housing tooling module 200. FIG. 8 illustrates an injection molding press 800 with an exemplary module carrier (e.g., module carrier 100) lowered into the press. The tie bar mount (e.g., tie bar mount 101 of module carrier 100) is resting on the tie bars (801A and 801B) of press 800 so that the tooling modules on the carrier unit are facing the ejection side 802 of the mold base. The ejection side 802 of the mold base is movable and can be closed so that the face of ejection side 802 meets with the face of the tooling modules on the carrier module. Once the faces of the modules meet the ejection side 802 of the mold base, the modules can be coupled to the mold base and uncoupled from the module carrier using air locks. This procedure is discussed above and will be discussed further below.

The following procedure can be used to load a module carrier (e.g., module carrier 100 of FIG. 1A) onto a carrier cart (e.g., carrier cart 300 of FIG. 3). Using an overhead crane, a carrier (e.g., carrier 100) loaded with modules (e.g., module 200 shown by FIG. 2) is positioned above the carrier cart. The carrier is then lowered into a receiving portion of the carrier cart (e.g., carrier receiving unit 303 of FIG. 3). The carrier is designed such that each side of the carrier cart's mounting plate includes a channel (e.g., receiving channels 105A and 105B of FIG. 1A) for accepting a receiving rail (e.g., 304 and 305 of FIG. 3). Roller bearings positioned on either side of the channels (e.g., roller bearings 106 in FIG. 1A) facilitate receipt of the carrier onto the carrier cart. The carrier cart comes to rest when a module loaded onto the cart comes to settle on the carrier cart rest stand (e.g., rest stand 306 shown in FIG. 3).

Once the modules being carried by the carrier are resting on the carrier cart rest stand, an air line attached to the module carrier's air locks (e.g., air locks 104A to 104D (which are Segan locks) shown in FIG. 1A) is activated, forcing the air locks open. At this point, when the air locks are open, the modules can be pulled away from the carrier and replaced with new modules if necessary. When the air line to the carrier's air locks is closed, cutting off air to the locks, the locks close, and the modules cannot be removed from the carrier. Thus, while air is being supplied to the locks (i.e., the Segan locks are open) modules may be removed from the carrier.

The following procedure can be used to install modules onto a carrier (e.g., carrier 100 shown in FIG. 1A). After lowering a carrier into a receiving unit (e.g., receiving unit 303 of FIG. 3), an air supply to the carrier's air lock is activated, forcing the air locks open. After the locks have been opened, a "bottom" module (e.g., module 200 of FIG. 2) is positioned so that it rests on the carrier cart rest stand (e.g., rest stand 306 shown in FIG. 3). The module is positioned so that the male portion of the module's air locks (e.g., 201A and 201B illustrated in FIG. 2) mate with the female portion of the carrier's air locks (e.g., 104A and 104B shown in FIG. 1A). If the carrier is designed to hold two modules, a second module can be placed to rest on top of the first module and oriented so that the male portion of the module's air locks mates with the female portion of the carrier's air locks. When the modules are positioned on the carrier and the air locks are mated, the air supply to the carrier is disconnected and the air locks engage, locking the modules to the carrier.

Figure 9:
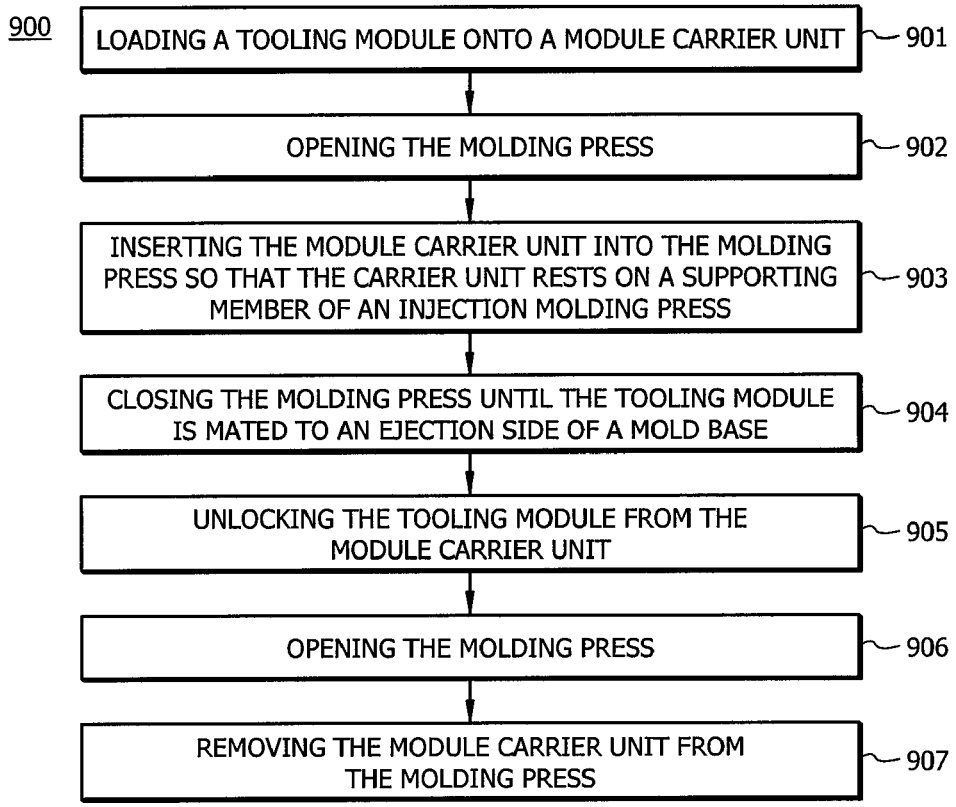
FIG. 9 is an illustration of an exemplary method adapted according to one embodiment of the invention.

FIG. 9 is an illustration of exemplary method 900, adapted according to one embodiment of the invention. In block 901, a tooling module is loaded onto a module carrier unit. In block 902, the molding press is opened.

In block 903, the module carrier unit is inserted into the molding press so that the carrier unit rests on a supporting member of an injection molding press. In block 904, the molding press is closed until the tooling module is mated to an ejection side of a mold base. In block 905, the tooling module is unlocked from the module carrier unit. In blocks 905 and 906, the molding press is opened, and the module carrier unit is removed from the molding press to, e.g., a cart.

One specific example of method 900 is as follows. The following procedure can be used to load a tooling module into a mold base in an example embodiment. A carrier cart (e.g., carrier cart 300 shown in FIG. 3) is placed near the press containing a mold base. The hooking mechanism of an overhead crane is attached to the carrier (e.g., through eye bolt 102 shown of module carrier 100 in FIG. 1A). After opening the press wide enough for the carrier unit carrying the tooling modules to fit inside, the crane is engaged to lift the carrier from the carrier cart and position the carrier unit above the mold press. The module carrier is then let down through the guides and tie bars until the tie bar mount (e.g., tie bar mount 101 shown in FIG. 1A) rests on top of the tie bars (e.g., tie bars 112 shown in FIG. 1B). Once the carrier is resting on the tie bars, air lines are connected to the air locks on the ejection side of the mold base. The air lines can then be activated to force air locks (e.g., Segan locks) on the ejection side of the mold base open. Once the air locks on the ejection side of the mold base are open, the mold is slowly closed until the mold base is fully contacted with the tooling module (i.e., the male adapter of tooling module is mated with the air lock). After the module is fully contacted with the mold base, the air is disconnected from the ejection side of the mold base, locking the module into place. Once the module is locked to the mold base, an air line to the carrier unit is activated, opening the module carrier's air locks and releasing the tooling module. At this point the mold press may be opened and the carrier is raised out of the press by the overhead crane.

Figure 10:
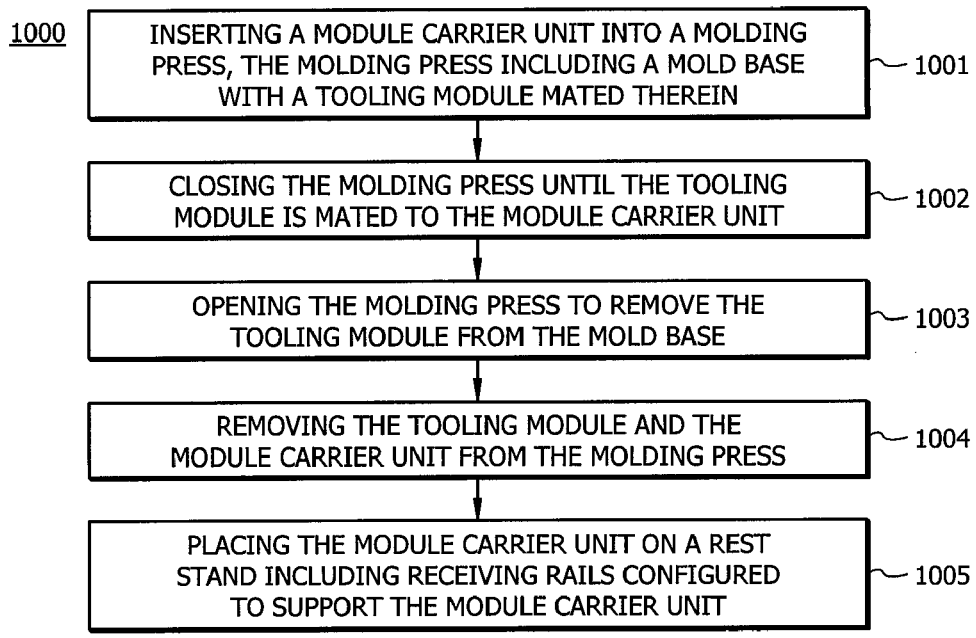
FIG. 10 is an illustration of an exemplary method, adapted according to one embodiment of the invention.

FIG. 10 is an illustration of exemplary method 1000, adapted according to one embodiment of the invention. In block 1001, a module carrier unit is inserted into a molding press, the molding press including a mold base with a tooling module mated therein. In block 1002, the molding press is closed until the tooling module is mated to the module carrier unit. In block 1003, opening the molding press to remove the tooling module from the mold base. In blocks 1004 and 1005, the tooling module, mated to the module carrier unit, and the module carrier unit itself are removed from the molding press and placed, e.g., on a rest stand, for instance, the rest stand shown in FIG. 3A.

One specific example of method 1000 is as follows. The following procedure can be used to remove a tooling module from a mold base in an example embodiment. A carrier cart (e.g., carrier cart 300 shown in FIG. 3) is placed near the press containing a mold base. The hooking mechanism of an overhead crane is attached to the carrier (e.g., through eye bolt 102 shown of module carrier 100 in FIG. 1A). After opening the press wide enough for the carrier unit carrying the tooling modules to fit inside, the crane is engaged to lift the carrier from the carrier cart and position the carrier unit above the mold press. The module carrier is then let down through the guides and tie bars until the tie bar mount (e.g., tie bar mount 101 shown in FIG. 1A) rests on top of the tie bars (e.g., tie bars 112 shown in FIG. 1B). Once the carrier is resting on the tie bars, air lines are connected to the air locks on the ejection side of the mold base. The air lines can then be activated to force air locks (e.g., Segan locks) on the ejection side of the mold base open. Once the air locks on the ejection side of the base mold are open, the mold is slowly closed until the mold base is fully contacted with the face of the module carrier (i.e., the male adapter of tooling module is mated with the female portion of the air lock on the module carrier). After the module is fully contacted with the carrier unit, the air is disconnected from the carrier unit, locking the module into place on the carrier unit. Once the module is locked to the carrier unit, an air line to the carrier unit is activated, opening the ejection side of the base module's air locks and releasing the tooling module. At this point the mold press is opened so that the tooling module is pulled free of the ejection side of the base module. Once the tooling module is free of the base module the air can be disconnected from the air locks on the base module and the carrier is raised out of the press by the overhead crane.

The following example procedure may be used as work instructions for removing tooling modules from a carrier cart:
  Position carrier cart next to workbench and hook up air line to air switch located on carrier.
  Activate air switch to carrier, which will open the Segan locks. Once Segan locks are open the top module will be resting on the bottom module and the bottom module will be resting on the carrier rest stand.
  Remove the top module from the carrier without disturbing the bottom module.
  Remove the bottom module from the carrier.
  Turn air off. You will see and hear the Segan locks close.
  Disconnect air line.

The following example procedure may be used as work instructions for installing modules onto a module carrier:
  Position carrier cart next to workbench and hook up air line to air switch located on carrier.
  Activate air switch to carrier, which opens the Segan locks on the carrier.
  Place "bottom" module on carrier rest stand (with module Segan adapters facing . . . ).
  Push module up against carrier face entering into Segan locks.
  Place "top" module and let it rest on top of bottom module.
  Push module up against carrier face entering into Segan locks.
  Turn off air to carrier. You will hear and see the Segan locks lock onto the module.
  Disconnect air line.

The following example procedure may be used as work instructions for quick change module loading of tooling modules into a injection molding press:
  Receive carrier cart with changed over modules.
  Place carrier cart beside designated press.
  Use overhead crane and attach carrier to crane using eye bolt.
  Open press, making sure press is open wide enough to accept carrier holding modules.
  Lower carrier through guides until it rests on top of tie bars.
  Hook up air lines from air switch located on press to the carrier and to the ejection side of the mold base.

Activate air switch to let air into the mold base; this opens up the Segan locks.

Slowly close the mold on low pressure to attach the module to the ejection side mold base.

When the mold base is fully closed use the air switch to turn off the air to the mold base; this locks the module onto the mold base.

While the mold is still closed use the air switch to activate air into the carrier, this will open up the Segan locks on the carrier and allows the module to release from the carrier.

Slowly open the mold and observe to make sure the module is attached to the mold base.

Remove air lines to the carrier and mold base.

Use the crane to raise the carrier out of the press and place the carrier back on the carrier cart.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   loading a tooling module onto a module carrier unit;
   inserting the module carrier unit into a molding press so that the carrier unit rests on at least one tie bar of an injection molding press; and
   closing the molding press until the tooling module is mated to an ejection side of a mold base.

2. The method of claim 1 wherein loading the tooling module comprises:
   removing the tooling module from a carrier cart.

3. The method of claim 2 further comprising:
   moving the module carrier unit from the carrier cart to the molding press using an overhead crane.

4. The method of claim 1 further comprising:
   opening the molding press before inserting the module carrier unit.

5. The method of claim 1 further comprising:
   unlocking the tooling module from the module carrier unit;
   opening the molding press; and
   removing the module carrier unit from the molding press.

6. The method of claim 5 further comprising:
   placing the module carrier unit on a carrier cart.

7. A method comprising:
   locking a tooling module onto a module carrier unit with one or more air locks;
   inserting the module carrier unit into a molding press so that the carrier unit rests on a supporting member of an injection molding press; and
   closing the molding press until the tooling module is mated to an ejection side of a mold base.

8. A method comprising:
   loading a tooling module onto a module carrier unit;
   inserting the module carrier unit into a molding press so that the carrier unit rests on a supporting member of an injection molding press;
   closing the molding press until the tooling module is mated to an ejection side of a mold base;
   unlocking the tooling module from the module carrier unit;
   opening the molding press;
   removing the module carrier unit from the molding press;
   closing the molding press so that the tooling module is mated to an injection side of the mold base;
   inserting a thread-molding core into the tooling module;
   extruding moldable material into the tooling module from the injection side of the mold base;
   allowing the tooling module to cool; and
   unwinding the thread-molding core from the tooling module.

9. A method comprising:
   inserting a module carrier unit carrying a tooling module into a molding press until the module carrier unit rests on a supporting member of the molding press;
   opening locks on an ejection side of a mold base in the molding press;
   closing the molding press until the tooling module is coupled to the ejection side of the mold base in the molding press;
   closing the locks on the ejection side of the mold base; and
   opening locks on the module carrier unit: and
   removing the module carrier unit from the molding press.

10. The method of claim 9, wherein removing the module carrier unit from the molding press comprises:
    opening the injection molding press.

11. The method of claim 9, wherein removing the module carrier unit from the molding press comprises:
    placing the module carrier unit on a rest stand including receiving rails configured to support the module carrier unit.

12. The method of claim 9 further comprising:
    inserting a thread-molding core into the tooling module;
    extruding molding material into the tooling module, forming a threaded item; and
    retracting the thread-molding core from the tooling module into an injection side of the mold base.

13. The method of claim 9 wherein the locks on the ejection side of the mold base comprise normally closed air locks.

14. The method of claim 9 wherein the locks on the carrier unit comprise normally closed air locks.

15. A method comprising:
    inserting a module carrier unit into a molding press, the molding press comprising a mold base with a tooling module mated therein; and
    closing the molding press until the tooling module is mated to the module carrier unit;
    opening the molding press to remove the tooling module from the mold base; and
    removing the tooling module and the module carrier unit from the molding press.

16. The method of claim 15, wherein removing the tooling module and the module carrier unit from the molding press comprises:
    placing the module carrier unit on a rest stand including receiving rails configured to support the module carrier unit.

* * * * *